United States Patent [19]
Van Beersel et al.

[11] Patent Number: 5,589,019
[45] Date of Patent: Dec. 31, 1996

[54] METHOD FOR APPLYING COVERING MATERIAL TO AN ELONGATE SUBSTRATE

[75] Inventors: Jozef Van Beersel, Temse, Belgium; Robin C. John, Bath, United Kingdom

[73] Assignee: NV Raychem SA, Kessel-Lo, Belgium

[21] Appl. No.: 295,896

[22] PCT Filed: Mar. 9, 1993

[86] PCT No.: PCT/GB93/00487

§ 371 Date: Oct. 4, 1994

§ 102(e) Date: Oct. 4, 1994

[87] PCT Pub. No.: WO93/17857

PCT Pub. Date: Sep. 16, 1993

[30] Foreign Application Priority Data

Mar. 9, 1992 [GB] United Kingdom ............ 9205073
Oct. 30, 1992 [GB] United Kingdom ............ 9222797

[51] Int. Cl.⁶ .................................................. B32B 31/00
[52] U.S. Cl. .................. 156/184; 156/187; 156/428; 156/443
[58] Field of Search .................. 156/184, 187, 156/188, 191, 195, 443, 447, 446, 428, 429, 431, 432; 242/520, 546.1

[56] References Cited

U.S. PATENT DOCUMENTS

| | | |
|---|---|---|
| 1,883,401 | 10/1932 | Rolfs et al. . |
| 2,027,962 | 1/1936 | Currie ........................................ 18/55 |
| 2,070,925 | 2/1937 | Rolfs et al. ............................... 242/392 |
| 2,271,528 | 2/1942 | Pfohl ......................................... 242/392 |
| 3,086,242 | 4/1963 | Cook et al. ................................... 18/1 |
| 3,470,057 | 9/1969 | Stuart, Jr. et al. ...................... 156/392 |
| 3,597,372 | 8/1971 | Cook ............................................ 260/4 |
| 4,061,513 | 12/1977 | Danielson ................................ 156/392 |
| 4,319,610 | 3/1982 | Eckner ................................... 156/195 X |
| 4,322,262 | 3/1982 | Cottam .................................... 153/392 |
| 4,359,502 | 11/1982 | Caponigro et al. ..................... 428/251 |
| 4,372,796 | 2/1983 | Greuel, Jr. ............................... 156/187 |
| 4,461,429 | 7/1984 | Goekler et al. ......................... 242/7.22 |
| 4,610,403 | 9/1986 | Goekler et al. ......................... 242/7.23 |

FOREIGN PATENT DOCUMENTS

| | | | |
|---|---|---|---|
| 0023788 | 2/1981 | European Pat. Off. | B29C 27/20 |
| 0121674 | 10/1984 | European Pat. Off. | B65H 81/00 |
| 0163508 | 12/1985 | European Pat. Off. | B29C 61/10 |
| 0181233 | 1/1993 | European Pat. Off. | B05D 1/36 |
| 3206582 | 9/1993 | Germany | B05D 7/14 |
| 575292 | 2/1946 | United Kingdom . | |
| 572292 | 2/1946 | United Kingdom . | |
| 1445336 | 8/1976 | United Kingdom | B65H 81/06 |
| 1452902 | 10/1976 | United Kingdom | B65H 81/00 |
| 2032564 | 5/1980 | United Kingdom | F16L 23/00 |
| 2212590 | 7/1989 | United Kingdom | F16L 58/16 |
| 2237087 | 4/1991 | United Kingdom | B29C 63/14 |

*Primary Examiner*—James Engel
*Attorney, Agent, or Firm*—Marguerite E. Gerstner; Herbert G. Burkard

[57] ABSTRACT

Wrapped covering material, e.g. tape is applied around an elongate substrate, such as a pipe, using an apparatus comprising a hollow frame mounted on rollers that is rotatable about the substrate, a delivery device for holding the covering material, mounted on the frame, and pressure rollers designed to press down on the covering material.

2 Claims, 5 Drawing Sheets

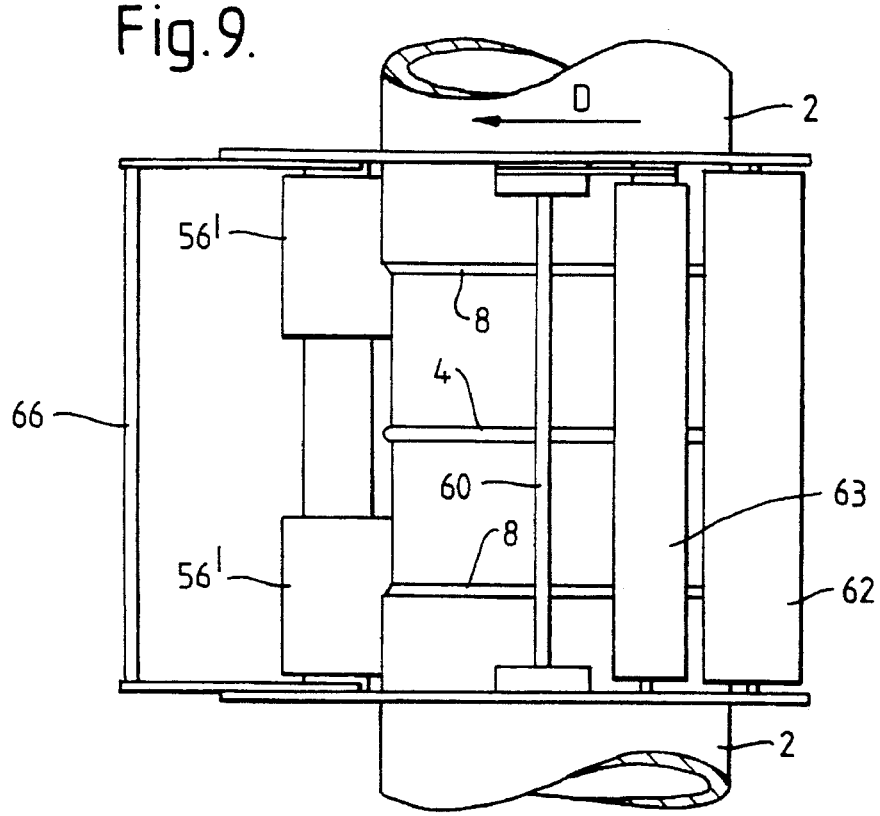
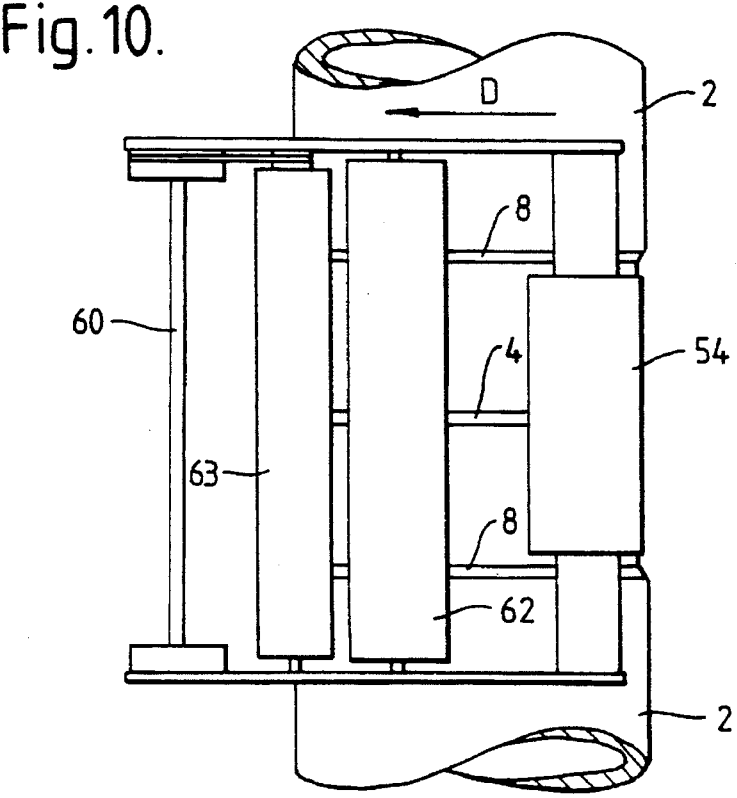

METHOD FOR APPLYING COVERING MATERIAL TO AN ELONGATE SUBSTRATE

BACKGROUND OF THE INVENTION

1. Field of the Invention

This invention relates to an apparatus and method for applying a wrapped covering material around an elongate substrate or around a joint between such substrates, and in particular to an apparatus and method for applying tape or a wraparound sleeve around pipes or cables (or joints between pipes or between cables) in a void-free manner.

2. Introduction to the Invention

It is well known to wrap covering material around elongate substrates such as pipes or cables or joints therebetween in order to provide a protective coating, for example against corrosion or mechanical abuse or other environmental factors. One common example where a protective coating is required is where metal pipelines, factory coated with a thin polymeric outer layer (known as a mill coating), are joined by welding in the field. The mill coating is traditionally a sintered or extruded polyethylene layer. More recently multi-layer coatings comprising sequentially a fusion bonded epoxy layer, a hot melt adhesive layer and an outer polyethylene layer have become popular. Typical mill coatings are 1.5 to 9 mm thick. In order to form the weld, the mill coating, whatever its nature, must first be removed. This means that after the welding there is a bare pipe portion around the weld that needs to be protected. Solutions to this involve wrapping tape, e.g. polymeric tape, or a wraparound polymeric sleeve around the bare portion. Where a wraparound sleeve is used this may be heat recoverable (preferably heat shrinkable), and may be closed around the pipeline by an adhesive coated patch closure as described for example in U.S. Pat. No. 4,359,502, European Patent Publication No. 23,788, and European Patent Publication No. 163,508, and as also described, for example, in Raychem's WPC (Wraparound Pipe Sleeve) installation instructions. By a heat recoverable article is meant one whose dimensional configuration may be made to change when subjected to an appropriate treatment. Usually these articles recover, on heating, towards an original shape from which they have previously been deformed, but the term "heat recoverable" also includes an article which, on heating, adopts a new configuration, even if it has not been previously deformed. Typically heat-recoverable articles comprise a radially heat-shrinkable sleeve exhibiting the property of elastic or plastic memory, as described, for example, in U.S. Pat. No. 2,027,962, U.S. Pat. No. 3,086,242, and U.S. Pat. No. 3,597,372.

In order to achieve good bonding of the tape or sleeve to the pipeline it is known to preheat the substrate (in the case of an applied heat recoverable tape or sleeve) or to use epoxy primers applied to the pipeline before application of the sleeve or tape as described for example in European Patent Publication No. 181,233, the entire disclosure of which is incorporated herein by reference. Even with these additional precautions it is sometimes possible for air voids to be trapped between the covering sheet or tape and the underlying substrate, which may be undesirable in some circumstances. To remove or at least to minimize these voids it is known to use a hand-roller to roll out the voids in the heat-installed heat shrinkable sleeve or tape or in the cold-installed wrapped tape. Preheating of a substrate prior to installation of a heat-shrinkable sleeve, and hand-rolling of the shrunk sleeve, are both described, for example, in the above mentioned Raychem WPC installation instructions. While hand-rolling can be effective it is time consuming and, of course, installer sensitive.

SUMMARY OF THE INVENTION

We have made, accordingly to the present invention, an apparatus which can be used both to deliver a covering material such as tape or a sleeve to an elongate substrate, and also to apply a radially inward pressure on the delivered covering material, so that a void free installation can be automatically achieved without depending on an installer hand-rolling to eliminate voids.

Thus a first aspect of the invention provides an apparatus for applying a wrapped covering material to cover an elongate substrate or a joint between such substrates, comprising:

(a) a hollow frame which can be positioned around the elongate substrates(s), and which is mounted on two or more wheels or rollers that, in use, can be rolled around the substrate(s) causing the frame to rotate relative to the substrate(s);

(b) a covering material delivery device mounted on the frame, for receiving the covering material and for delivering it onto the surface of the substrate(s) as the frame is rotated; and (c) one or more pressure rollers that may be the same as, or additional to, the rollers defined in (a), the rollers being arranged to press radially inward onto the delivered covering material as the frame is rotated.

A second aspect of the invention provides a method of applying a wrapped covering material around an elongate substrate or a joint between such substrates comprising:

(a) positioning the apparatus according to the first aspect of the invention around the substrate(s) so that the frame surrounds the substrate(s) and the wheels and/or rollers rest on the substrate;

(b) mounting the covering material in the delivering device; and (c) rotating the frame relative to the substrate thereby delivering the covering material and causing the pressure roller(s) to press radially downward on the covering material.

DETAILED DESCRIPTION OF THE INVENTION

According to the invention the frame surrounds the substrate. By this is meant that the frame may surround the entire periphery of the substrate (i.e. around 360°), or may surround only part of the periphery of the substrate.

The frame may be rotated relative to the substrate by rotating the frame, rotating the substrate, or both.

The present invention advantageously achieves an installation that can be fully automatic, can provide an essentially void free installation and can also be significantly faster than the prior art hand-rolling technique. Another advantage of the automatic nature of the delivery and pressure applied is that uniform application of pressure can be provided over the whole surface of the elongate substrate. This is in contrast to hand-rolling, where the installer does not always have equal access to all sides of the substrate, and also tends to concentrate on "problem areas", especially where the elongate substrate to be covered is large, resulting in non-uniform pressure application.

The covering material is preferably a tape or a wraparound sleeve. It may be wrapped circumferentially around the substrate(s), or helically. In order to wrap the covering material circumferentially, the apparatus is arranged, similarly, to move circumferentially around the substrate. If the covering material is to be wrapped helically the apparatus is arranged to move longitudinally as well as circumferentially around the substrate(s) in order to achieve this.

The delivery device for the covering material may be any suitable configuration. It may for example comprise a spool or the like on which the covering material is rolled. The material is then simply unrolled for delivery.

The roller(s) preferably comprise a resilient material such as silicone rubber or the like. The resilience enables the roller to conform to any bumps on the substrate(s). Preferably a layer (preferably the outer layer) of resilient material is provided on the roller. This preferably has a hardness in the range of shore A 30–60, and a thickness in the range of 15 to 50 mm. This resilience and thickness enable the roller to accommodate and conform to small irregularities in the surface of the substrate as it presses the covering material against the substrate.

Preferably the frame and roller(s) are so arranged that the roller(s) press the covering material firmly against the underlying substrate. Preferably the roller(s) extend generally parallel to the axis of the substrate, and roll around the circumference of the substrate. In one preferred embodiment, one (or more) rollers can be moved from a first stop position to a second stop position relative to the frame, wherein when the roller is in the first position it is further from the substrate than in the second position. Preferably the arrangement is such that in the first position the roller does not press on the substrate, but in the second position it does. Thus, for example, the roller may extend, generally parallel to the axis of the substrate, between bars that are pivotally fixed to the frame, whereby the bars can pivot in a plane substantially perpendicular to the axis of the substrate to move the roller(s) between the said first and second positions. In addition, or instead, the roller(s) may be resiliently biased against the covering material and underlying elongate substrate. Other equivalent biasing means could also be used as would be evident to the man skilled in the art.

Preferably the frame and rollers are arranged such that the roller(s), or at least one of the rollers, exert a radial pressure of about 20 Kg/cm$^2$ on the underlying covering material and elongate substrate(s).

One application where it is particularly preferred for more than one roller to be used is where a wraparound sleeve is to be wrapped around a welded joint between two coated metal pipes which have been bared of coating in the weld region, e.g. a welded joint between two mill coated steel pipes. In this case a ridge is produced around the weld, the so-called "weld bead", and two further size transitions exist on either side of the weld bead at each bared edge of the (mill) coating. Where a sleeve is wrapped around such a welded joint the weld bead and (mill) coating transitions are common areas where voids may form. According to a preferred embodiment of the present invention the apparatus and method may be arranged so that one roller acts on the weld bead region, and another roller (or two other rollers) acts on the transitions between the pipe coating and the bare pipes. The use of separate rollers means that the appropriate pressure can be applied in each position to eliminate voids. The appropriate pressure to be applied is different over the weld bead and over the coating/bare metal transitions because the size and shape of each is different.

Where two or more rollers are used, their swept areas, (i.e. the areas that they roll over when the frame is rotated) are preferably arranged to overlap, or at least to meet. This ensures that there is no area of unrolled delivered covering material.

The frame of the invention is positioned around the elongate substrate. It may be slid over one end of the substrate. In general, however, a free end of substrate is not available. In these cases, therefore, the frame can preferably be positioned around the elongate object(s) from one side. As one example, the frame may be arranged to be a wraparound configuration, for example hinged, with some sort of holding mechanism to hold the frame closed. As another example, where two or more rollers act both as the frame's wheels and as the pressure rollers, and one or more of the rollers can be moved from a first stop position where it does not press against the substrate to a second stop position where it does press against the substrate, then the arrangement is preferably such that with the roller in the first stop position the frame can be brought into position from one side of the substrate, and with the roller in the second stop position the frame is held against the substrate (so it does not fall off when rotated around the substrate).

The apparatus and method according to the invention can be used to apply tape or sleeves that are non-heat-recoverable, slightly heat recoverable (e.g. less than 5% recovery) or heat recoverable of say 10–70% especially 15–50%. Where a recovery ratio is defined in terms of a percentage, the ratio represents the change in a dimension as a percentage of the same dimension before recovery.

The apparatus and method can be used where preheating of the substrate is required or where no preheating is required. Preheating may typically be required, for example, to apply a sleeve or tape (which may or may not be heat recoverable) that is coated with a heat-activatable adhesive such as a hot melt adhesive. Especially suitable hot-melt adhesives include, for example, polyamides, ethylene vinylacetate copolymers and terpolymers (with or without incorporated waxes) and polyesters. No preheating may be needed to apply tapes or sleeves coated with a sealant, such as a mastic.

Where preheating is used, the pipeline typically needs to be preheated to above 100° C., sometimes 150° C., 200° C. or even 220° C. In one embodiment according to the invention, preheating is used in combination with slightly heat-recoverable covering materials (i.e. less than 5% recovery). In this case the recovery temperature of the covering material may be arranged to be lower than the preheating temperature, so that the heat applied to preheat the elongate substrate can also effect recovery of the covering material. A small amount of recovery may be desirable in the covering material to compensate for any thermal expansion of the sleeve during installation.

The apparatus and method according to the invention can also be used in applications where there is no heat applied, either preheat or heat to shrink a sleeve. As an example, it can be used to apply helically wrapped overlapping tape and to apply pressure to the overlap region of the tape, or to cold-applied sleeves. Indeed we have found that using our invention a good bond can be achieved between some mastic coated sleeves and a pipeline without preheating of the pipeline, even though with prior art techniques (e.g. handrolling) preheating was required to achieve the same bond.

Where preheating is carried out, this may advantageously be done by use of an induction heater positioned around the substrate before the frame is put into position. Alternatively the heater may be positioned on the frame.

The apparatus and method can also be used to deliver covering material having a recovery ratio greater than 5%, e.g. 15–70%. In this case it is preferably delivered by the apparatus according to the invention and then heated to effect recovery. In this case if preheating is also carried out, the preheating is preferably to a temperature lower than the recovery temperature of the covering material, so that full recovery of the covering material does not take place at the preheating stage.

In certain applications of the invention, it is desirable to combine a preheating of the pipe with preheating also of the adhesive coated covering material, before it contacts the pipeline. As an example the pipe may be preheated to the temperatures indicated earlier, e.g. to a temperature in the range 140° to 160° C., and the coated covering material heated to about the tack temperature of the adhesive coating on the covering material. This tack temperature will depend on the material of the adhesive. It may be in the range 140° to 180° C., e.g. 150° to 170° C. A suitable arrangement for heating the covering material (e.g. tape) before it contacts the pipeline is to position an infrared heater between the delivery device for the covering material and the pressure rollers. This infrared heater may be supported on the frame.

Where preheating of the adhesive-coated covering material is carried out, the speed of the pay-off of the covering material from the delivery device is preferably substantially matched to the speed of the relative rotation between the frame and the pipeline, so that the covering material (which may soften at the elevated preheat temperatures) is not stretched or allowed to shrink before it contacts the pipeline.

One advantage of the preheating of the coated covering material is that when the heated adesive contacts the pipeline it will adhere better to the pipeline than if it had not been preheated. Similarly where the covering material is helically applied with overlapping edges, e.g. helically wrapped overlapped tape, the adhesive adheres better in the overlap region than if it had not been preheated. Another advantage is that the preheated covering material is softer than a non-preheated covering material. Therefore it can conform more easily to irregularities in the pipe surface. These advantages are particularly useful where the covering material is applied over a joined pipeline with a protruding weld bead. Usually weld beads project radially outwards as an annular flange (e.g. about 4 mm), and it is common to smooth the transition at such weld beads by using a weld bead filler, e.g. a mastic, positioned around the bead. Such a filler avoids the problem of a tent-shaped void appearing beneath a covering material over the weld bead. However, we have found that by using a preheated covering material in the way described it is possible to avoid the need for a weld bead filler.

Where covering over weld beads is concerned, and in other applications, it may be useful to include a "following" roller which acts on the same region of covering material as the first "leading" roller, or on a smaller or on a larger region. Where a roller is used over a non-uniform surface, e.g. a tape overlap region or a weld bead, it may have a bevelled lower surface.

Where temperatures of about 130° to 170° C., e.g. 140° to 160° C., are used to preheat the pipe and the covering material and to form the initial bond between the pipe and covering, it may also be desirable to use an induction heater to heat the surface of the pipe to a higher temperature of say 200° C. or 240° C. for a few seconds to ensure a good bond to the pipe. This method ensures that only the bonding surface is heated to 200° C. or more, and this heat is rapidly distributed through the heat sink of the pipe. Therefore the overall temperature of the pipe advantageously does not need to be heated to such high temperatures.

The combined preheating of substrate and the adhesive-coated covering material provide another aspect of the invention.

Thus a futher aspect of the invention provides a method of applying a wrapped covering material around an elongate substrate or a joint between such substrates comprising:

(a) positioning an apparatus comprising
   i) a hollow frame which can be positioned around the elongate substrates(s), and which is mounted on two or more wheels or rollers that, in use, can be rolled around the substrate(s) causing the frame to rotate around the substrate(s);
   ii) a covering material delivery device mounted on the frame, for receiving adhesive-coated covering material and for delivering it onto the surface of the substrate(s) as the frame is rotated;
   iii) one or more pressure rollers that may be the same as, or additional to the rollers defined in (i), the rollers being arranged to press radially inward onto the delivered covering material as the frame is rotated; and
   iv) a heater, preferably an induction heater, for heating the adhesive-coated covering material before it contacts the pressure rollers
so that the frame surrounds the substrate(s) and the wheels and/or rollers rest on the substrate;
(b) mounting the adhesive-coated covering material in the delivery device;
(c) preheating the substrate to 130° to 170° C.;
(d) preheating the adhesive-coated covering material to about the tack temperature of the adhesive with the said heater; and
(e) rotating the frame relative to the substrate thereby delivering the covering material and causing the pressure roller(s) to press radially downward on the covering material.

While the apparatus and method can be used with heat recoverable covering materials an advantage of the invention is that a fight fit of covering material about an elongate substrate can be achieved without the need to use heat recoverable coverings, or at least to use only those with recovery less than 5% ( to compensate for thermal expansion). This is cost and time effective since it eliminates the expansion step typically required to render a heat-recoverable covering material recoverable.

Another advantage of the tight wrap achieved by the present invention is that material usage is minimized, which is cost-effective.

BRIEF DESCRIPTION OF THE DRAWINGS

Embodiments of the invention will now be described, by way of example, with reference to the accompanying drawings; wherein

FIGS. 9 and 10 are side views of the apparatus of FIG. 7, at different positions of its rotation around the substrate of FIG. 1.

DETAILED DESCRIPTION OF THE DRAWINGS

Figure 1:
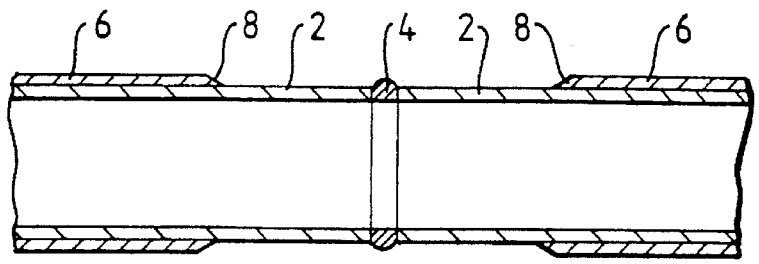
FIG. 1 is a cross sectional view through a welded joint between two pipes which is to be covered using an apparatus and method according to the invention.

Referring now to the drawings, FIG. 1 shows two steel pipes 2 welded together. The weld bead 4 projects in a ridge above the surface of pipes 2, typically by a height of 4 to 5 mm. Typically the weld bead 4 is about 18 mm in width. In order to form the weld the mill coating 6 on each pipe 2 has been bared at the weld region. Typically each mill coating is about 6 mm thick, and is removed from about 150 to 200 mm length on either side of the weld bead. Thus a size transition exists at the edges 8 of the mill coating. The welded joint of FIG. 1 is to be protected by applying a wraparound sleeve to cover the entire bared region of steel pipes 2, and to overlap onto the mill coating on either side of the bared region. This is described with reference to FIGS. 2 to 6.

Figure 2:
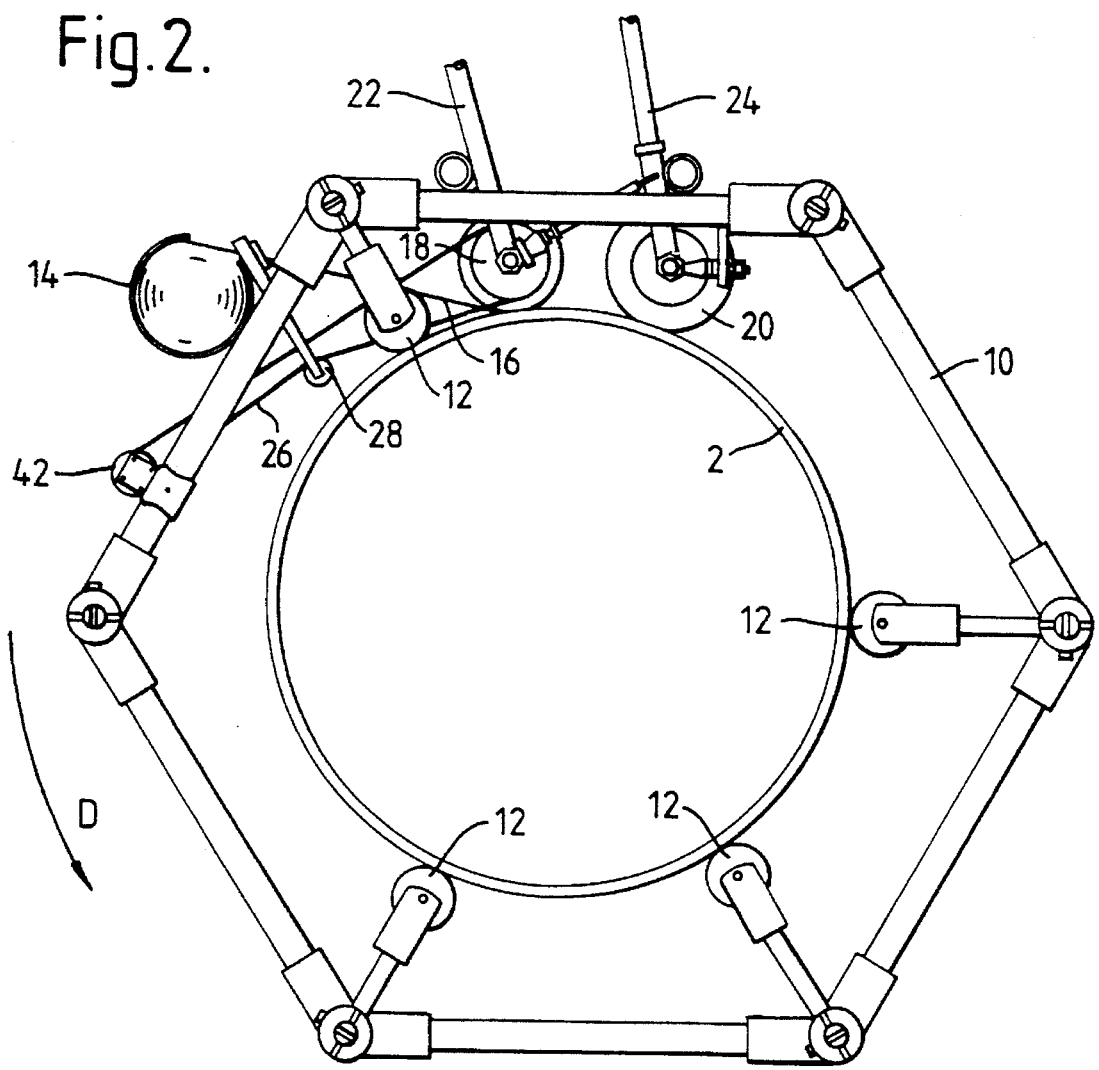
FIGS. 2 and 3 are a side elevation and a plan view respectively of a first apparatus according to the invention suitable for covering the joint of FIG. 1.

FIG. 2 is a cross-sectional view showing the apparatus according to the invention surrounding the welded pipes 2. The apparatus comprises a hollow frame 10 surrounding the pipes 2. The frame is mounted on four wheels 12 which rest against the outer surface of the pipe and allow the frame to be rotated about the pipes in the direction indicated by the arrows D. Mounted on the frame is a covering material (wrapped sheet) delivery device 14 in the form of a spool on which the wrapped sheet 16 is rolled, and from which it is delivered to the surface of the pipe 2. This delivery device is described in more detail with reference to FIG. 6. Also mounted on the frame 10, close to, but behind the delivery device 14 (as measured in the direction of rotation D), are two rollers 18 and 20. These are mounted on the frame 10 by pivoted bars 22 and 24 respectively, allowing the rollers 18 and 20 to be moved from a first position (not shown) in which they do not press tightly against the pipe 2, to a second position (as illustrated) in which they urge against the sheet 16 and pipe 2. The rollers 18 and 20, each comprise silicone rubber, and each rolls around the pipe and presses onto the delivered sheet 16 as the frame 10 is rotated. The wrapped sheet 16 comprises a polymeric sheet material coated with adhesive which is in turn covered with a release layer. This is described in more detail later with reference to FIG. 6b. Therefore as the adhesive coated sheet is installed the release layer needs to be pulled off, and reeled up. This is achieved by take-up spool 42 for the release paper, spool 42 being driven by belt 26 and roller 18, via roller 28.

Figure 3:
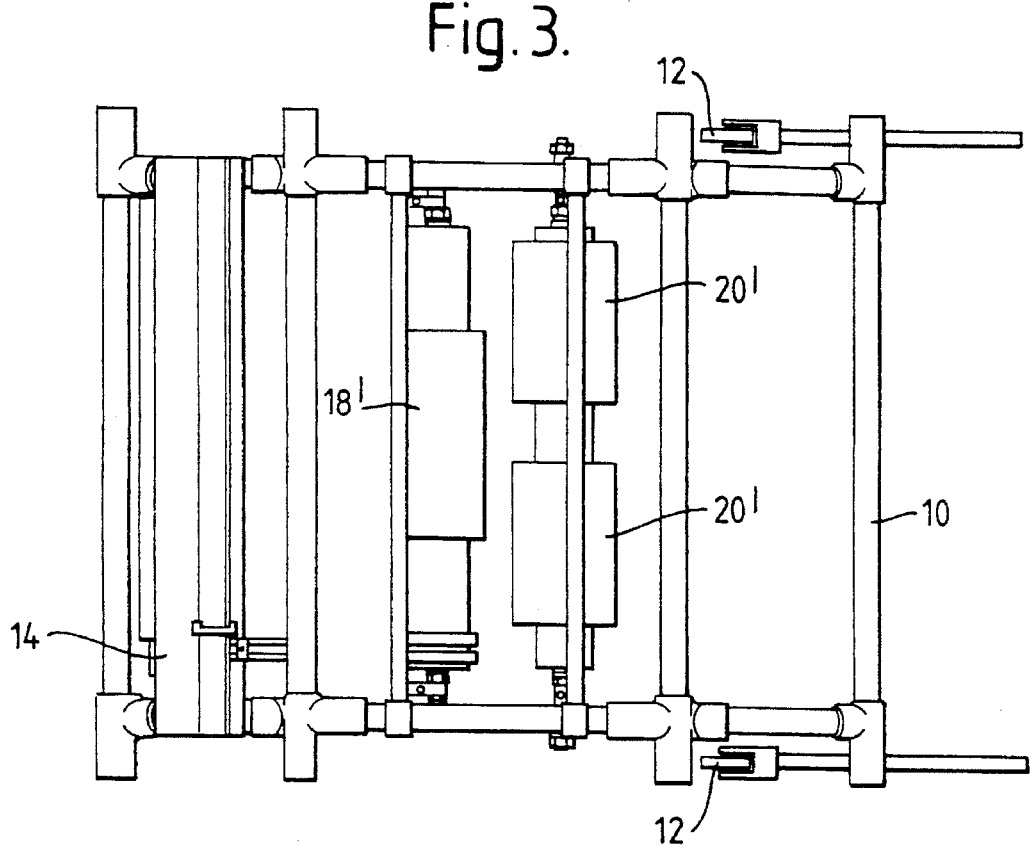

FIG. 3 is a plan view of the apparatus of FIG. 2. This makes it clear that roller 18 comprises a single central roller part 18', while roller 20 comprises two edge roller parts 20' and no central portion of roller. The purpose of this is so that roller part 18' applies a radial pressure on the portion of the cover 16 covering the weld bead 4, while roller parts 20' exert a radial pressure on the parts of cover 16 overlying transition regions 8 at the edges of the mill coating. The downward pressure exerted by roller parts 18' and 20' may be the same, but is preferably different, as appropriate for the different sizes and shapes of the projection of weld bead 4 and transition regions 8. The swept areas of roller parts 18' and 20' (i.e. the areas rolled when the frame 10 is rotated) overlap.

Therefore with reference to FIGS. 2 and 3 operation and installation of sleeve 16 is achieved by unrolling a short length from the delivery spool 14, fixing it to a point on the pipe 2, and then rotating the frame 10 in the direction of arrow D. Continued rotation of the frame causes the remainder of the sleeve 16 to unreel slowly from the spool 14, and at the same time causes roller parts 18' and 20' to roll around the pipe with the frame and to press radially inwards onto the sleeve 16 so that a void free bond between the sleeve 16 and the pipeline 2 is achieved. The bonding may be achieved by an adhesive or sealant coating on the sleeve 16, or by primer on the pipe in a manner known hitherto. This is not illustrated in FIGS. 2 and 3.

Figure 4:
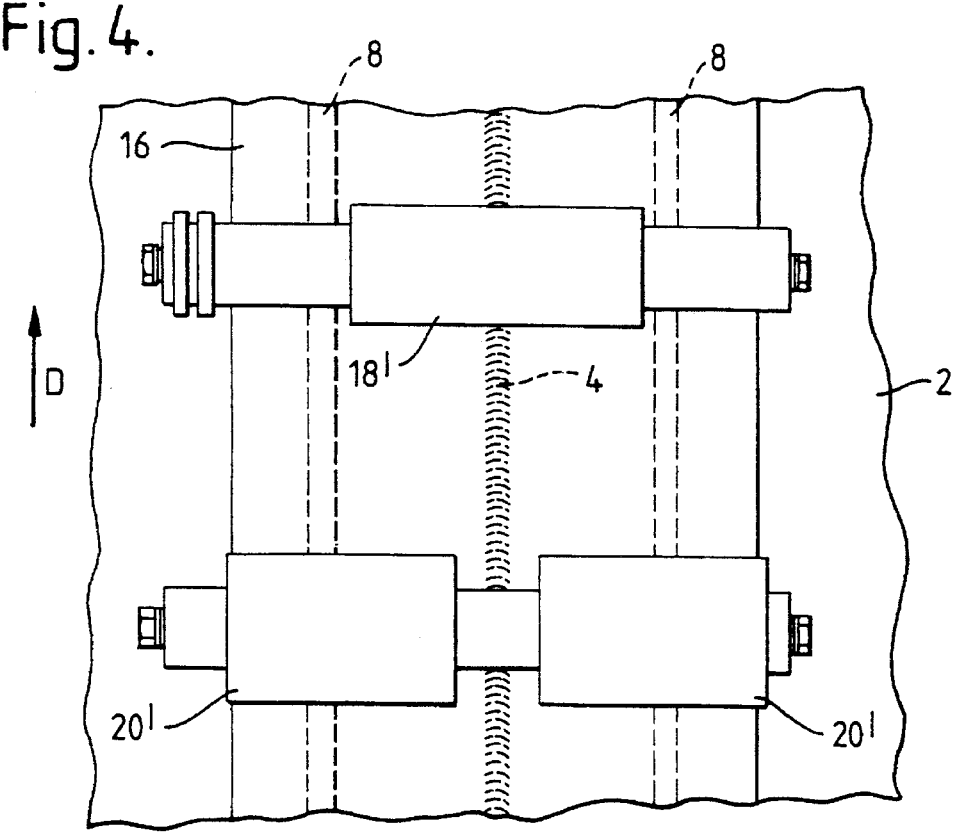
FIGS. 4 and 5 are plan and side views of the rollers of the apparatus of FIG. 2 applied to the welded joint of FIG. 1.
Figure 5:
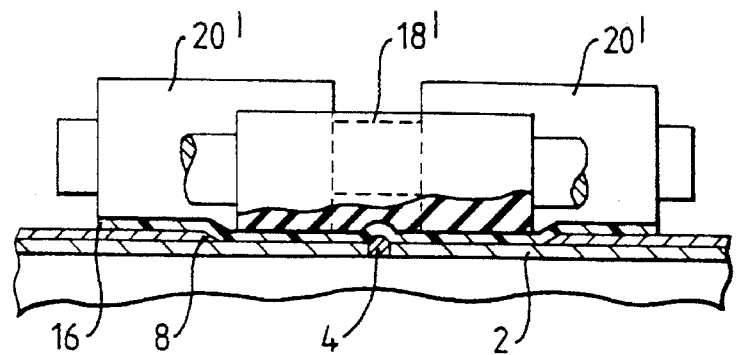
Figure 6:
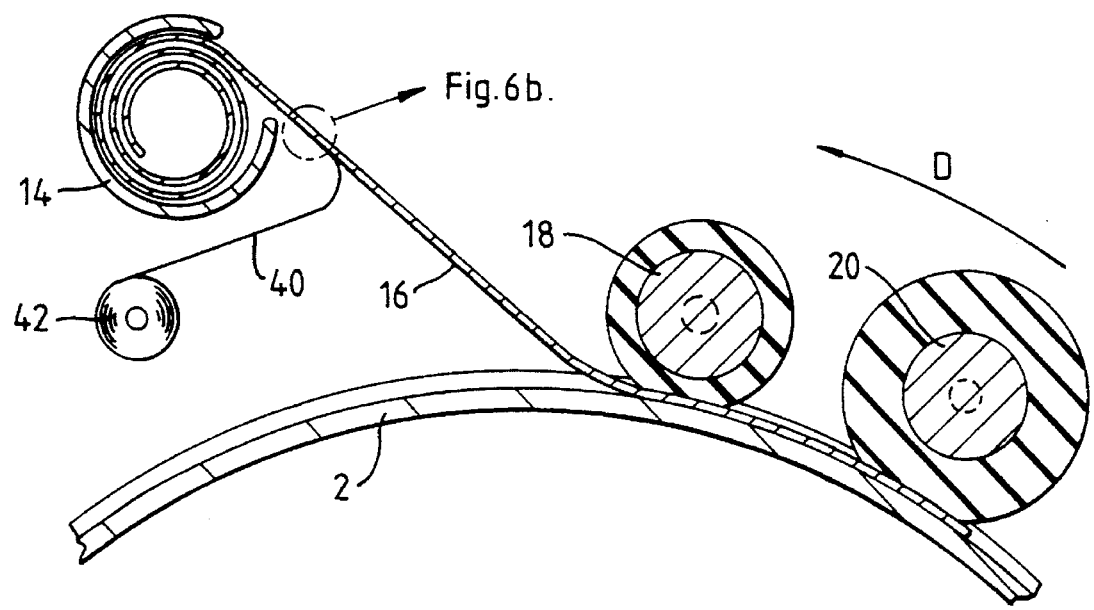
FIG. 6a is an enlarged side view of the application of the rollers of FIGS. 2 to 5 to apply the covering material to the welded joint of FIG. 1.
FIG. 6b is a side view of the covering material.
Figure 6:
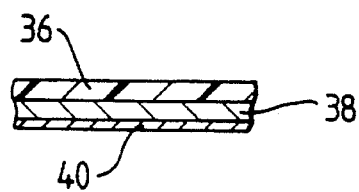

FIGS. 4 and 5 are enlarged plan and side views showing the position of rollers 18 and 20 relative to the weld bead 4 and transition regions 8. FIG. 4 also makes it clear that the central roller part 18' (acting on the weld bead 4) leads the edge roller parts 20' (acting on transition regions 8) as measured in the direction D of rotation of the frame 10.

FIG. 6a is an enlarged sectional view showing the delivery of covering material 16 to the pipe surface 2. FIG. 6b is an enlarged part sectional view through the sheet material 16.

Referring to FIG. 6b, the sheet material 16 delivered from the delivery spool 14 comprises a polymeric sheet material 36 coated with a pressure sensitive adhesive layer 38 which in turn is coated with a release layer 40. Turning now to FIG. 6a, as the sheet material 16 is delivered between the pipe 2 and rollers 18 and 20 the release layer 40 is pulled away and fed onto its own take-up spool 42. Thus as the frame 10 (not shown) is turned in the direction indicated by arrow D (counter clockwise in the drawing) the delivery spool 14, take up spool 42 and also rollers 18 and 20 also move in the direction of arrow D. The sheet material 36 is however bonded by adhesive 38 to the pipes 2. As the apparatus rotates, therefore, the remainder of the spooled sheet 16 unreels from the spool 14 and is similarly pressed against and bonded to the underlying pipes 2.

Figure 7:
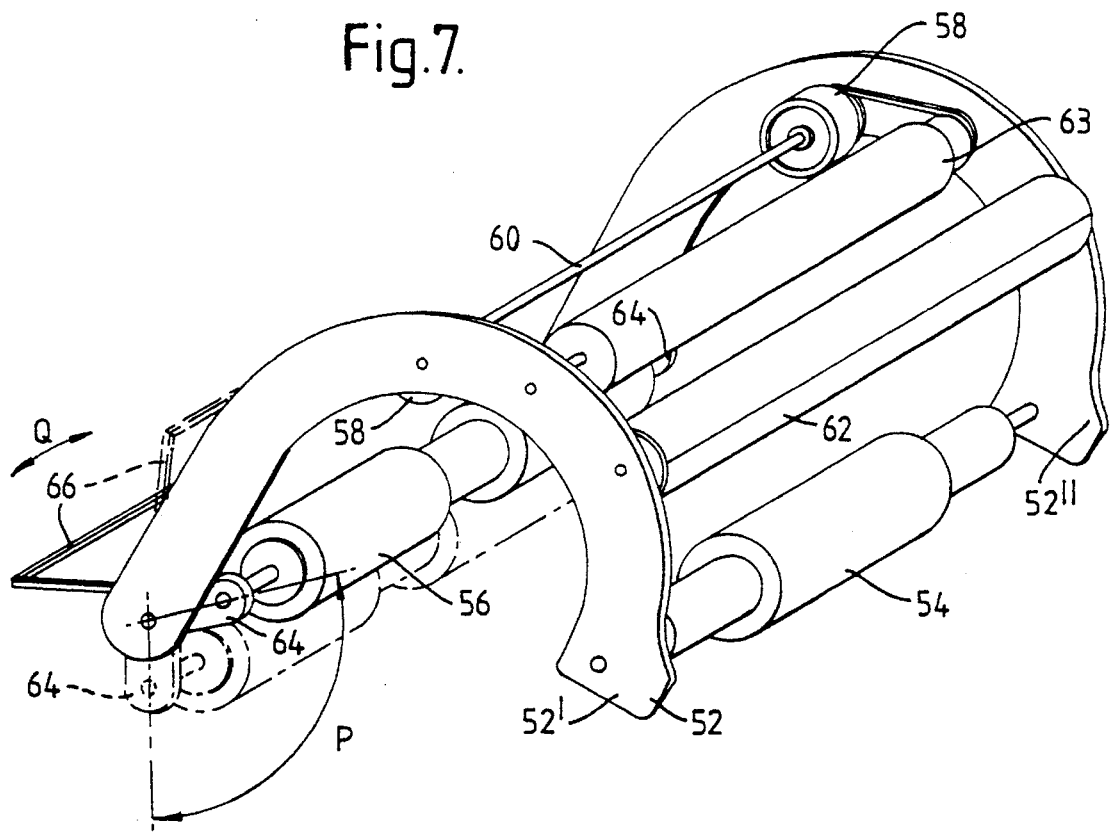
FIG. 7 is a perspective view of a second apparatus that can be used to cover the joint of FIG. 1.

FIG. 7 shows an alternative configuration of apparatus. In this case the frame 52 is not a closed loop, but can extend only part way around the substrate. It comprises two curved arms 52' and 52" spaced from each other, and between which the rollers 54 and 56 and other parts (as explained later) extend. Unlike the rollers 18 and 20 of the embodiment of FIGS. 1 to 5, the rollers 54 and 56 act not only as the pressure rollers on the delivered covering material, but also as wheels or rollers for the frame, i.e. they perform the function also of some of the wheels 12 in the embodiment of FIGS. 1 to 5. A further pair of wheels 58 is also included. Rollers 54 and 56 extend between opposite ends of each of the curved arms 52' and 52", and the pair of wheels 58 turn on an axle 60 extending between arms 52' and 52" of the frame, at a mid point on the arms 52' and 52". Thus rollers 54 and 56 together with wheels 58 perform the function of wheels 12 of the earlier embodiment. A covering material delivery device 62, and a release paper take-up spool 63 (corresponding to the devices 14 and 42 respectively in the earlier embodiment) are also included, extending between curved arms 52' and 52" of the frame 52.

The roller 54 extends directly between arms 52' and 52" of the frame. Roller 56 in contrast extends between the ends of two bars 62, the opposite ends of which are pivotally connected to one end of each of curved arms 52' and 52". The connection is such that bars can pivot in the plane of the curved arms 52' and 52" between two stop positions, as illustrated by the Arrow P in the Figure (one stop position being shown by dotted lines). This change in position can be carried out by moving handle 66 (which is fixed to bars 64) in the direction indicated by arrows Q. The effect of this movement is to move the roller 56 from a first position (as illustrated by the dotted Lines) in which it does not press against the covering material and underlying pipe, and in which the frame can be positioned from the side onto the substrate, to a second position (as illustrated by the continuous lines) in which the roller presses firmly against the covering material and underlying pipe, and in which the frame is clamped against the pipe, so that firm pressure is exerted by the rollers 54 and 56 as the frame rotates about the pipe, and the frame does not fall off when the frame is rotated through 360° around the substrate.

Figure 8:
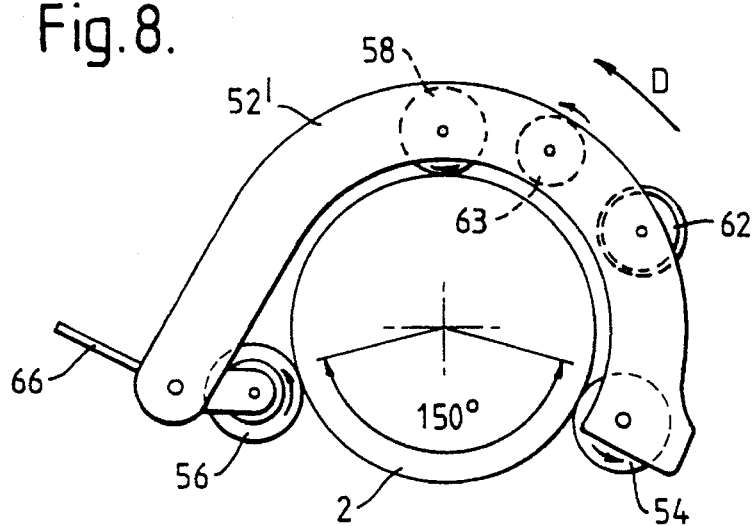
FIG. 8 is an end view of the apparatus of FIG. 7 positioned around the joint of FIG. 1.

FIG. 8 shows the apparatus of FIG. 7 positioned over the joint of FIG. 1. The apparatus is shown in a state ready to deliver the covering material from delivery device 62 when the frame is rotated in the direction indicated by arrow D. The handle 66 operating on roller 56 has moved roller 56 to the second position in which the rollers 54 and 56 and the frame 52 are clamped firmly against the pipe. As will be seen from the drawings the frame 52 extends 210° around the pipe (as measured from the center of rollers 54 and 56). Thus when the frame 52 is rotated through 360°, the frame does not fall off the pipe.

FIGS. 9 and 10 are side views of the arrangement of FIG. 8. In FIG. 9 the roller 56 is visible, and it can be seen that this in fact comprises two roller parts 56' which each act to press over the mill coating edges 8, in a similar manner to that described in FIG. 4. FIG. 10 is from the same view as FIG. 9, but after the apparatus has been rotated in direction of arrow D so that roller 56 is no longer visible, and roller 54 is visible. In this case it can be seen that roller 54 comprises a single central roller part 54, which acts on the weld bead area 4.

We claim:

1. A method of applying a wrapped covering material around a welded joint between two coated metal pipes bared of coating in the region of the weld, said method comprising:

(a) positioning an apparatus comprising
        i) a hollow frame which can be positioned around the joint, and which is mounted on two or more wheels or rollers that, in use, can be rolled around the joint causing the frame to rotate around the joint in a circumferential manner;
        ii) a covering material delivery device mounted on the frame, for receiving a wraparound covering material coated with an adhesive having a tack temperature and for delivering the adhesive-coated covering material onto a surface of the joint as the frame is rotated;
        iii) at least two pressure rollers which are arranged to press radially inward onto the delivered covering material as the frame is rotated, one roller being arranged to press against the weld region and the other roller acting on the transition between the pipe coating; and
        iv) a heater for heating the adhesive-coated covering material before it contacts the pressure rollers,
    said positioning being such that the frame surrounds the joint and the rollers;

(b) mounting the adhesive-coated covering material in the delivery device;

(c) preheating the joint to 130° to 170° C.;

(d) preheating the adhesive-coated covering material to about the tack temperature of the adhesive with the heater; and (e) rotating the frame circumferentially relative to the joint thereby delivering the covering material and causing the pressure rollers to press radially downward so that the roller pressing against the weld exerts a different pressure than the roller pressing against a transition between the pipe coating and the bared pipe.

2. A method according to claim 1 wherein each roller has a swept area and the swept areas of the rollers are arranged to overlap.

\* \* \* \* \*